(12) United States Patent
Abbott et al.

(10) Patent No.: US 10,287,536 B2
(45) Date of Patent: May 14, 2019

(54) SMALL SCALE GRAIN MALTING APPARATUS AND METHOD

(71) Applicant: Sprowt LLC, Minneapolis, MN (US)

(72) Inventors: Christopher Abbott, Minneapolis, MN (US); Mark Emmons, Minneapolis, MN (US)

(73) Assignee: Sprowt LLC, Minneapolis, MN (US)

( * ) Notice: Subject to any disclaimer, the term of this patent is extended or adjusted under 35 U.S.C. 154(b) by 274 days.

(21) Appl. No.: 15/175,614

(22) Filed: Jun. 7, 2016

(65) Prior Publication Data
US 2017/0349866 A1   Dec. 7, 2017

(51) Int. Cl.
*C12C 1/13*   (2006.01)

(52) U.S. Cl.
CPC ..................... *C12C 1/13* (2013.01)

(58) Field of Classification Search
CPC .. C12C 1/13; C12C 13/10; C12C 7/17; C12C 7/22
USPC ..................... 99/467, 278, 276, 277; 426/16
See application file for complete search history.

(56) References Cited

U.S. PATENT DOCUMENTS

| | | | | |
|---|---|---|---|---|
| 3,622,465 A * | 11/1971 | Orgel | ..................... | C12N 1/26 435/248 |
| 3,730,846 A * | 5/1973 | Neubert | ..................... | C12C 1/02 435/291.3 |
| 3,853,713 A * | 12/1974 | Colclough | ................ | C12C 1/02 34/130 |
| 4,583,300 A * | 4/1986 | Mast | ..................... | A23B 9/08 34/557 |
| 2013/0202736 A1* | 8/2013 | Reeves | ..................... | C12C 3/00 426/11 |
| 2014/0234482 A1* | 8/2014 | Kempfert | ................ | C12C 13/10 426/16 |

* cited by examiner

*Primary Examiner* — Dana Ross
*Assistant Examiner* — Kuangyue Chen
(74) *Attorney, Agent, or Firm* — Edward A. Weck

(57) ABSTRACT

An apparatus and method for malting grain having a hollow cylindroconical vessel and a first, smaller removable false bottom retaining grain used in cleaning, steeping and resting the grain and a second, larger removable false bottom used in germinating and kilning the grain. The apparatus also includes a pump, a cooling system, a fan, a heating system, a humidifier, an aeration system, valves, tubing and ducting for treating grain with water and air. Sensors communicate with a controller and control the pump, the cooling system, the fan, the heating system, the humidifier, the valves, and the aeration system.

9 Claims, 11 Drawing Sheets

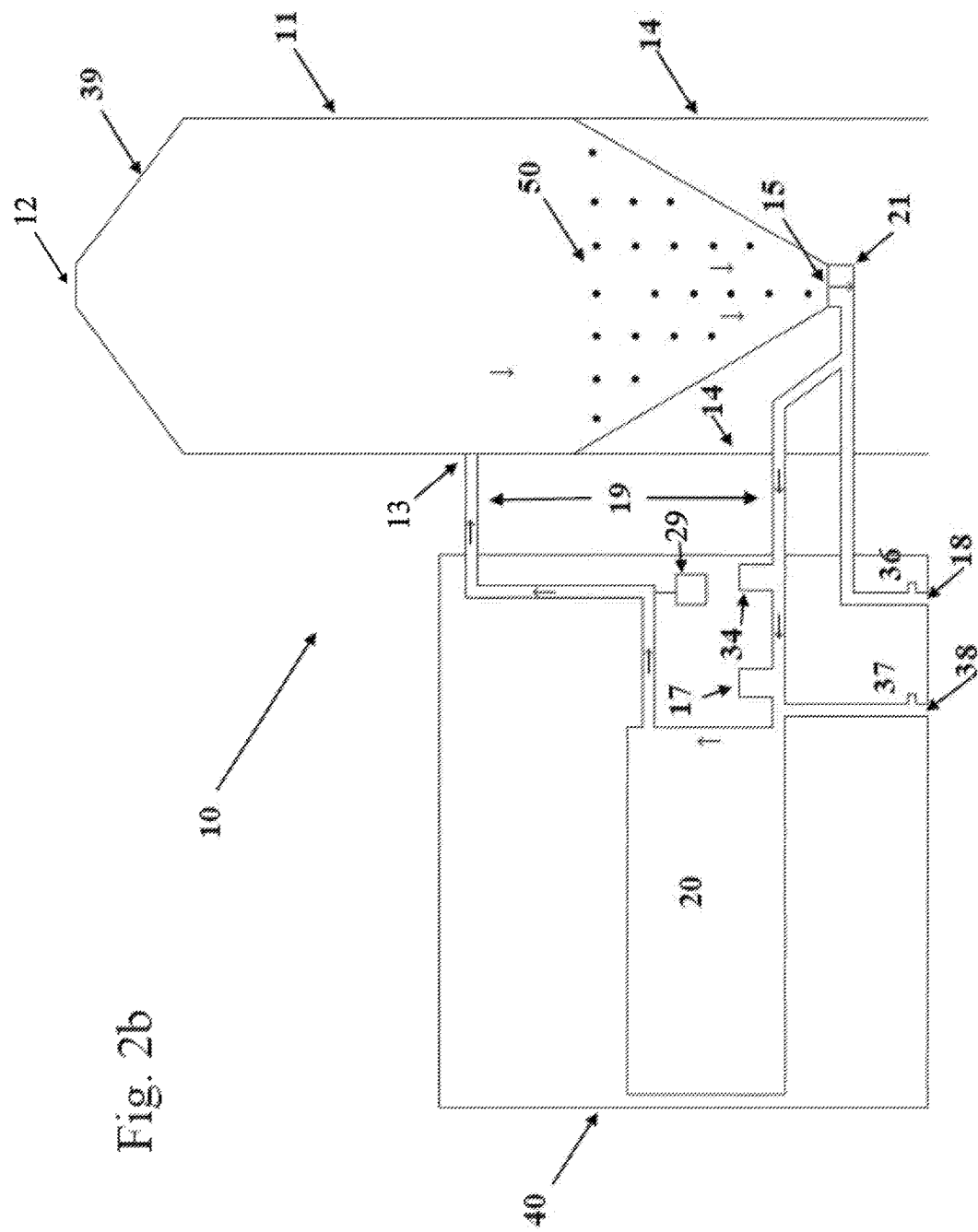

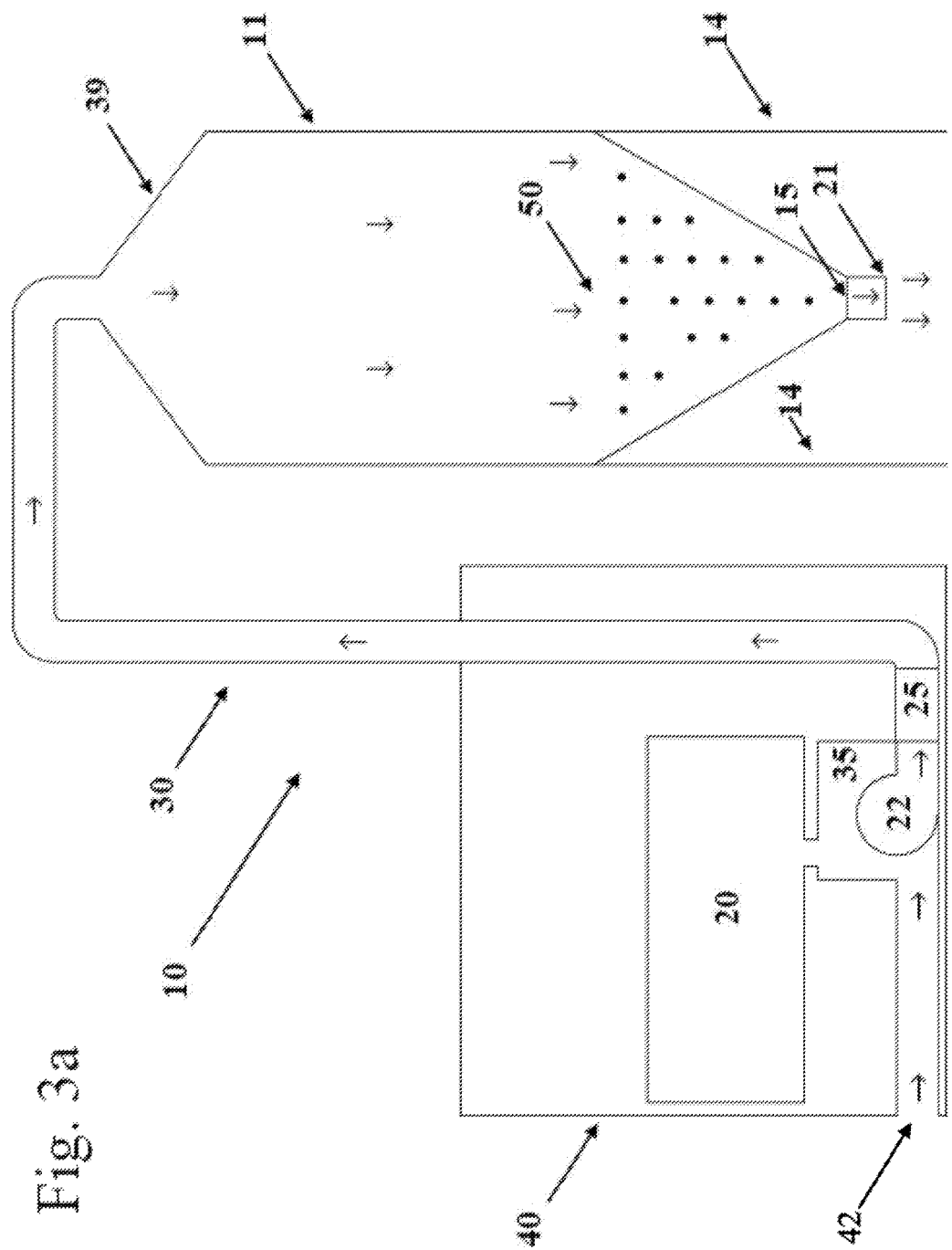

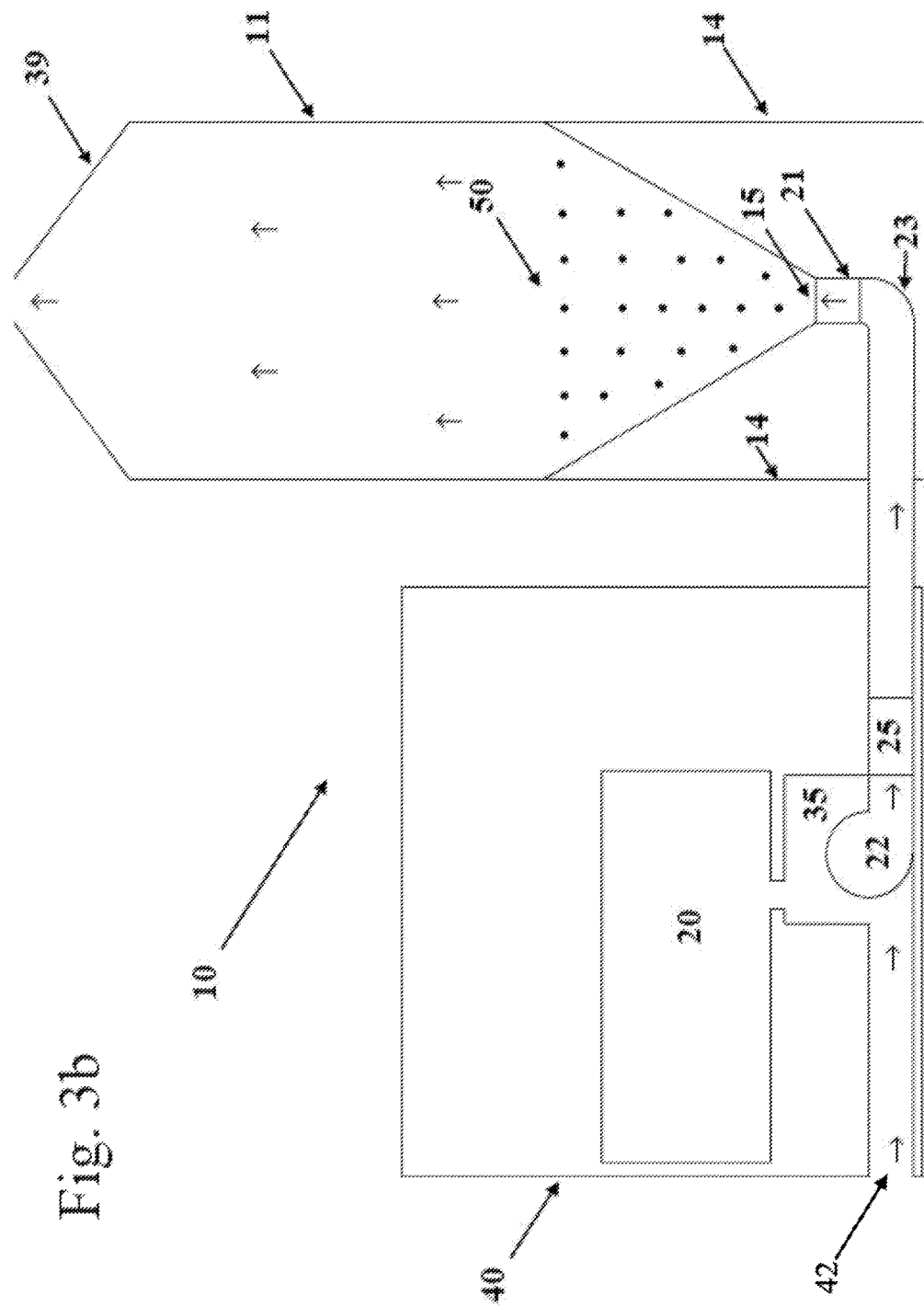

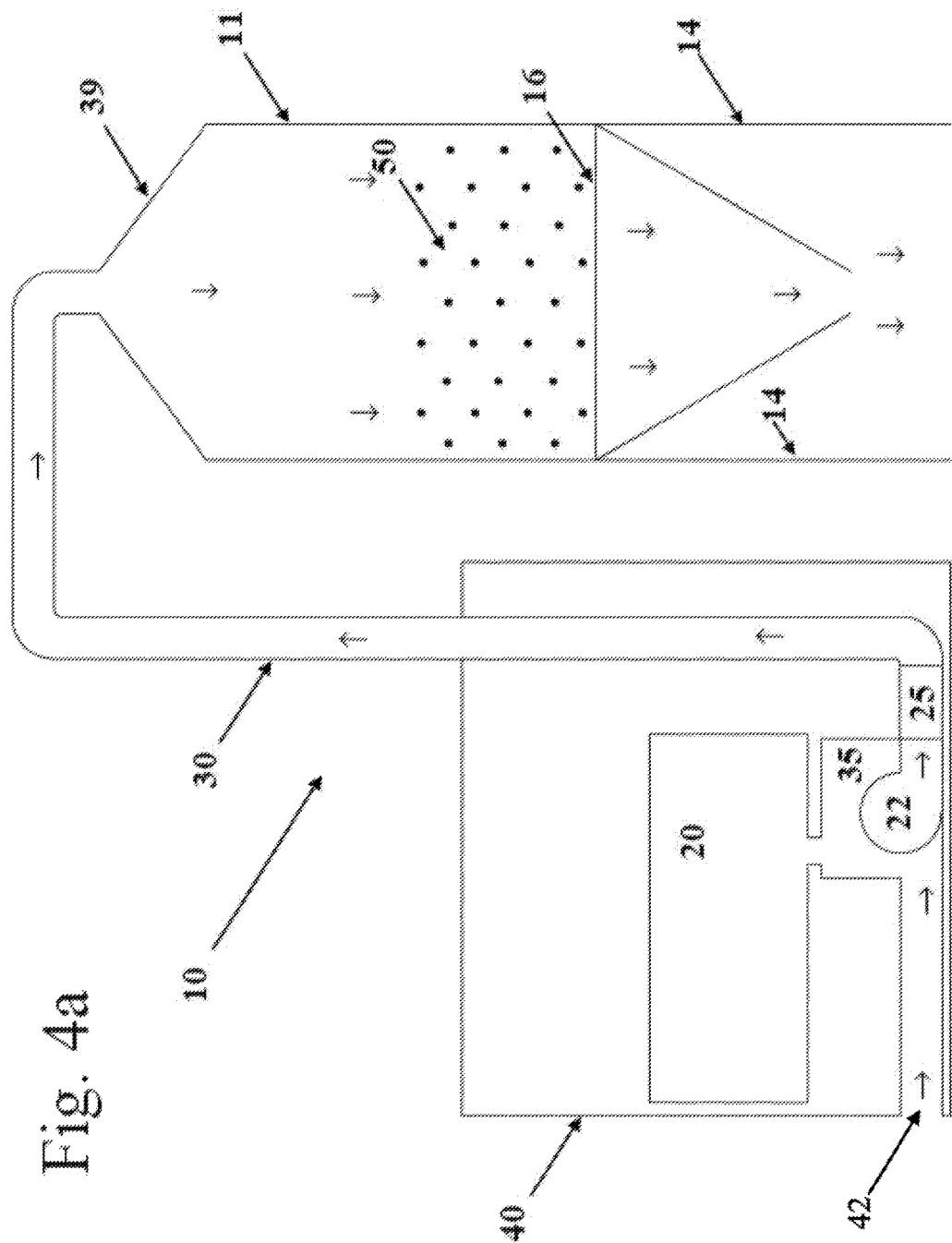

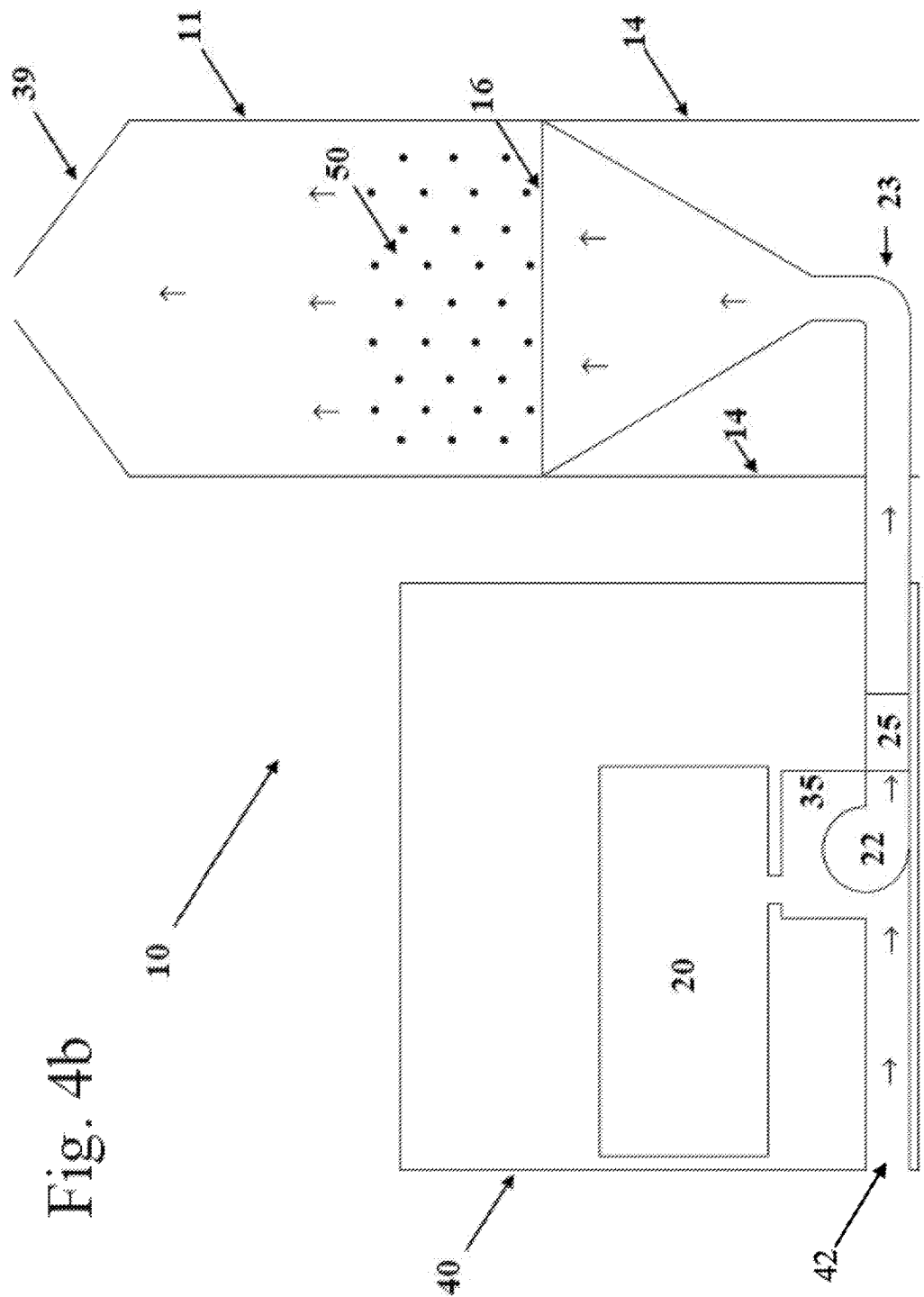

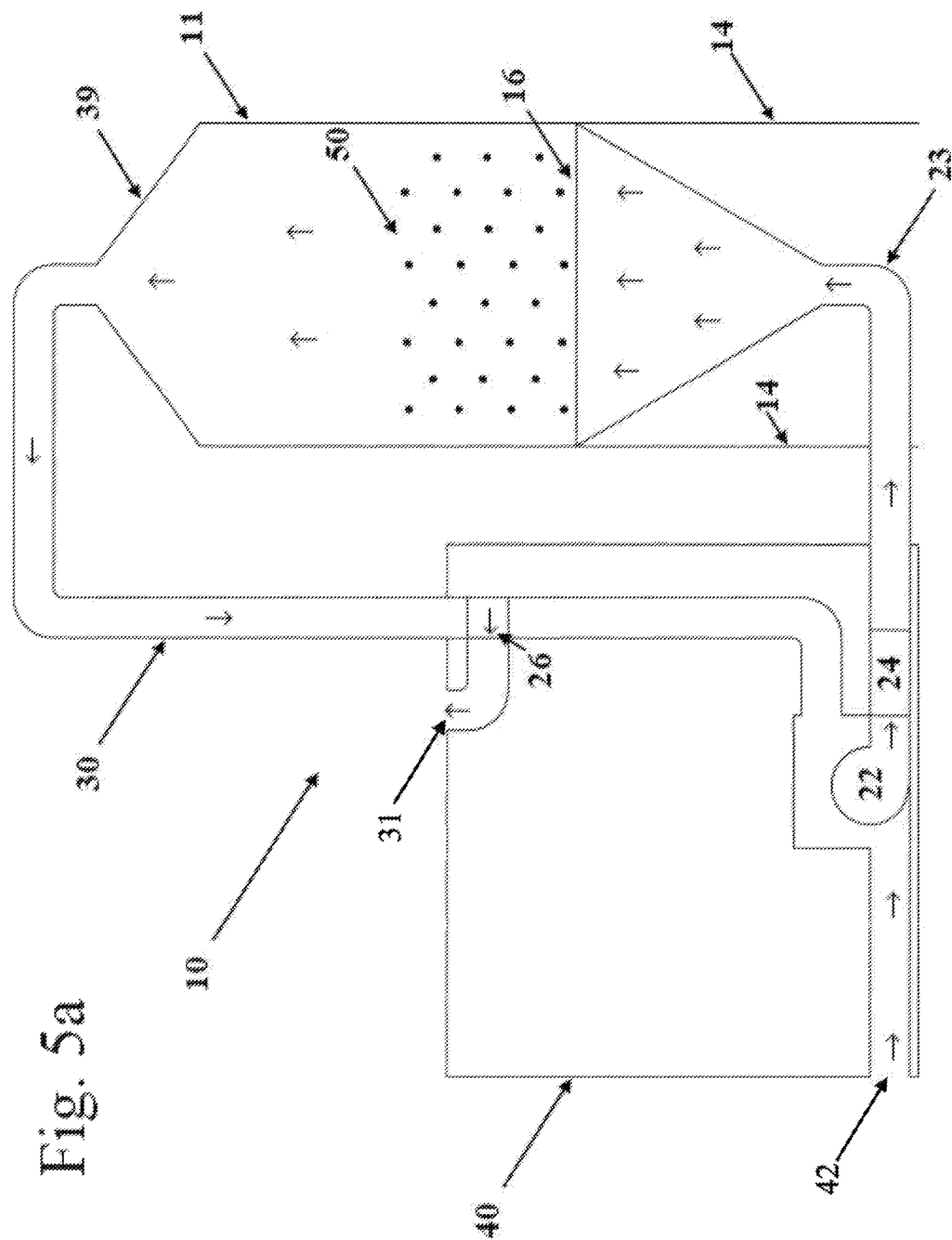

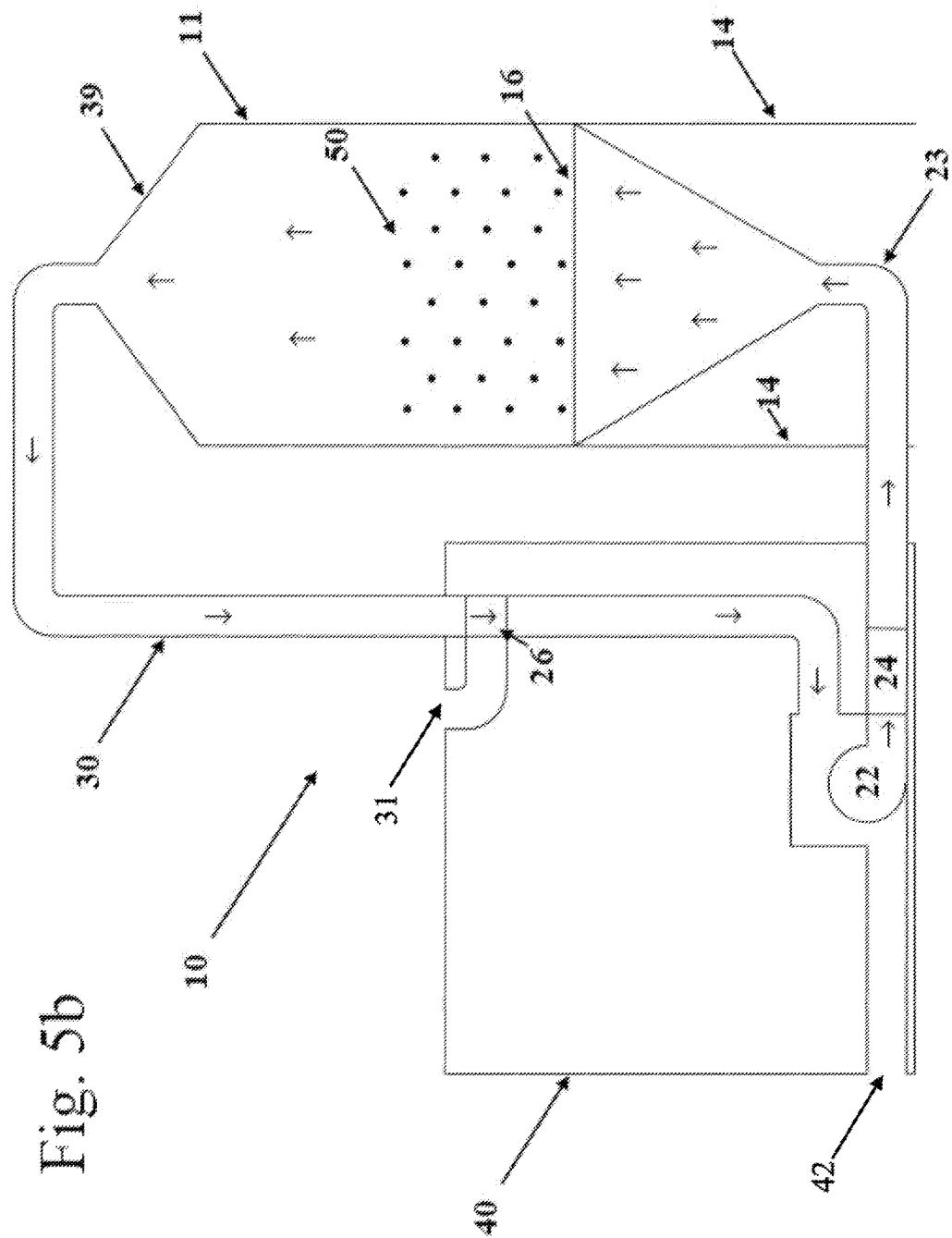

SMALL SCALE GRAIN MALTING APPARATUS AND METHOD

BACKGROUND OF THE INVENTION

Summary of the Invention

The present invention relates to a single-vessel, small-scale, automated, grain malting device for steeping, germinating and drying grain.

Description of the Related Art

Malted barley, or malt, is the basic ingredient used in the production of beer, providing complex carbohydrates and sugars necessary for fermentation, as well as contributing flavors and colors that are uniquely characteristic of beer. The malting process has six steps: cleaning, steeping, air rest, germination, kilning and roasting. Large scale malting typically utilizes three separate types of equipment: large cylindroconical vessels for the steeping phase; a large Saladin box for the germinating phase (a large rectangular container about 50 meters long with a set of vertical screws attached to a crossbar which moves horizontally across the length of the container while the motion of the screws raise the barley from the bottom to the top), and a double deck kiln for the drying and curing phases. Craft malting utilizes one of two methods: floor malting, where grain is steeped in conicals, and then dumped onto a concrete floor to germinate in a conditioned room; or pneumatic malting, where tanks are built to complete all malting steps, either using unimalters or multiple tanks. Both methods then use coffee roasters to make specialty malts.

Home brewing is the hobby production of beer at a small scale. Homebrewers currently rely on a handful of large malting companies for their supply of malt. These companies produce malt mainly for large breweries, and, thus, provide a cost-effective, consistent product, but a limited choice of malt that is rarely fresh. The small-scale production of malt by hobbyists would enable a much wider array of malt to be made from local, heirloom, historic, or unique varieties of grain, vastly expanding the "soul" of beer and, subsequently, beer flavors and styles. Home malting is not currently possible, as equipment does not exist to guarantee consistent, high-quality production of malt. Additionally, malting is a 24/7 process, requiring tending at all hours of the day, which is prohibiting to most hobbyists. There is a need for automated, small-scale malting equipment to satisfy homebrewers' desire for precise control and creativity in beer making, starting with the basic ingredient.

"Micro-malting" equipment is currently on the market produced by various lab equipment companies including Custom Laboratory Products Ltd (United Kingdom), 1-Cube s.r.o. (Czech Republic), Joe White Micromalters (Australia) and Micromalting Systems Pty Ltd (Australia). These systems offer large malthouses the ability to run malting tests on multiple (4, 8, or 16) small batch (0.5-1 kg) grain samples. These are large, expensive laboratory devices comprising two to three different pieces of equipment. The labor involved, size, and expense of these machines make them only suited to lab work done by skilled technicians.

Unimalters are known in the art and also known as Steep Germination Kiln devices. Awn Engineering (Hadley, Mass.), an offshoot of the most prominent U.S. craft malthouse, Valley Malt LLC (Hadley, Mass.), offers custom manufacture of a 1 ton unimalter device. The Canadian Malting Barley Technical Centre (Winnipeg, MB, Canada) has a custom 100 kg unimalter device, made by HDP Canada (Cambridge, ON, Canada). Students at Oregon State University (Corvallis, Oreg.) built a unimalter for their pilot brewing lab.

U.S. Pat. No. 3,589,270 (Schlimme, et al.) describes a single apparatus for preparing brewing malt in three steps, namely steeping, germinating, and drying. This eliminates the time and expense in transferring the grain to different vessels during the steeping process but relies on rotating worms and conveyors to mix the grain and discharge it from the system. The reliance on expensive grain moving equipment is not practical for the small-scale production of malt.

U.S. Pat. No. 3,730,845 (Schultz) describes an installation for producing green or cured malt having a closed annular chamber. The circular shape decreases dead-water space below the grain, thus decreasing water consumption. However, some volume of water remains below the grain bed and cannot be utilized. Additionally, a complex system of radial ribs is needed beneath the chamber for structural support.

U.S. Patent Application No. 2015/0307825 (Gorlitz, et al.) describes an apparatus and method for grain steeping, germinating, kiln drying and/or fermenting. This invention claims a box that is 2 to 2.5 m wide and roughly the shape of an ISO freight container and thus is easily transportable. This apparatus is too complex and large for use as a personal malting machine and requires loading, turning, and discharging equipment for operation, further limiting use by hobbyists. In addition, the use of a single location for the grain results in wasted water deadspace and promotes microbial growth over the weeklong malting cycle, raising the risk of mold and bacteria growth.

WO 1988/002396 A1 (Cleary) describes an automatic micromalting system. This invention is intended for laboratory micromalting, in which multiple samples of grain receive a simultaneous malting treatment in one machine. A conditioned tank contains the samples which are malted in separate cylinders that are rotated on rollers, which are susceptible to wear and breakdown. There is dead space between the cylinders that then receives a wasted treatment of conditioned water and air. In addition, this apparatus requires great skill to operate and is useful only for analyzing extremely small samples.

Japanese Patent No. 2015156815A (Hideyo) describes a malting apparatus and malting method which uses a rotary drum as a container for the grain. The mechanical complexity of rotating a drum can lead to frequent issues, such as misalignment resulting in machine breakdown. This also produces a poor air distribution system and excess remaining water.

European Patent Application EP 2377915A (Biondo, et al.) describes a machine and method for malting barley utilizing a substantially closed box-shaped body. This machine is of a large size, requires a significant amount of energy and also has the disadvantages of a rotating drum.

All in one, small scale malting equipment has always been custom built and thus relatively expensive. There is a need for simpler all-in-one malting equipment designed for small scale, hobby production and the home brewer, that with precise climate control can produce consistent, high quality malt. The use of a simpler, small scale, all-in-one malting apparatus would allow greater control over the malting process, the use of other types of grains (amaranth, buckwheat, spelt, triticale, sorghum, hazelnuts, chickpeas, quinoa, millet, emmer, black rice, corn, oats, teff, wild rice, chia, and others), the use of new/old barley varieties, greater malt freshness and customized malting.

SUMMARY OF THE INVENTION

Apparatus and methods in accordance with the present inventions may resolve many of the needs and shortcomings discussed above and will provide additional improvements and advantages.

The apparatus and method of the present invention includes a hollow vessel, legs supporting the hollow vessel, two false bottoms, a pump, a cooling system, water valves, an air valve, a fan, a heating system, a humidifier, sensors and a controller.

The apparatus for malting grain of the present invention includes: a hollow vessel having a vessel bottom and a vessel midsection; a first false bottom, removably positioned into a narrow end of the vessel, near the vessel bottom, retaining grain; a second false bottom, removably positioned into the midsection of the vessel, retaining grain; a fan connected to and in fluid communication with the vessel via top ducting and/or bottom ducting and allowing air flow through the vessel and the first and second false bottom; a heating system, in fluid communication with the fan and the vessel via the top and/or bottom ducting to heat air from the fan; a humidifier, in fluid communication with the fan and the vessel via the top and/or bottom ducting to humidify the air; sensors, to measure temperature and moisture; and a controller, in communication with the sensors, and controlling the fan, the heating system and the humidifier; where the first false bottom is used for cleaning and steeping grain and the first false bottom, the valve and the grain are removed from the vessel following cleaning, steeping and resting, and; the second false bottom is inserted into the vessel and the grain is returned to the vessel for germinating and kilning.

The apparatus for malting grain also has a first solenoid valve in fluid communication with a water inlet and a second solenoid valve in fluid communication with a water outlet and controlling filling and draining of the vessel with water; a pump in fluid communication with the vessel via the tubing and allowing water flow through the first false bottom, out of the vessel and back into the vessel; a cooling system in fluid communication with the vessel and the pump via the tubing and cooling the water; a first valve, removably attached to the vessel bottom and containing water when closed, and providing for air movement when open; a second valve connected to and in fluid communication with the fan and the vessel via the top ducting and directing airflow out an exhaust duct or back to the fan; an aeration system in fluid communication with the vessel via the tubing and aerating the water; and the controller further controls the first and second solenoid valves, the pump, the cooling system, the first and second valves, and the aeration system.

The apparatus for malting grain also has a refrigerant to air heat exchanger, in closed loop with the cooling system, to cool and dehumidify air.

The apparatus for malting grain also has a filter, in fluid communication with the vessel and the pump via tubing to filter particles out of the water;

The apparatus for malting grain also has a vessel with a volume between four and four hundred liters.

The apparatus for malting grain also has a vessel shaped like a cylindroconical, a cylinder, a large cylinder stacked on smaller cylinder, a conical, a box, a pyramid or a box stacked on pyramid.

The apparatus for malting grain also has a vessel shaped like a cylindroconical.

The apparatus for malting grain also has the controller in communication with a touchscreen on the component box, an app on a smartphone or a wifi controller providing internet connectivity, with the controller accepting user input and using algorithms, derived formulas and look up tables.

The apparatus for malting grain also has a flow meter, a weight sensor, a carbon dioxide sensor, a dissolved oxygen sensor, an air flow sensor, a current measurement sensor and/or a vibration sensor.

The apparatus for malting grain also has a component box housing the pump, the cooling system, the fan, the heating system, the controller, the power supply, the filter, the first and second solenoid valves, the tubing, the top ducting, the bottom ducting, the water inlet and outlet, the humidifier, the heat exchanger, the second valve, and the aeration system.

A method for cleaning grain, steeping grain, resting grain, germinating grain and kilning grain, includes: positioning a first false bottom removably into a narrow end of a hollow vessel, near a vessel bottom, retaining grain; cleaning the grain by filling the vessel with water and overflowing the water, removing non-grain foreign matter; removing the first false bottom, the valve and the grain from the hollow vessel following cleaning, steeping and resting of the grain; positioning a second false bottom removably into the midsection of the hollow vessel, retaining grain and returning the grain on top of the second false bottom; circulating air through the hollow vessel and a second false bottom, removably positioned into a midsection of the vessel, by a fan connected to and in fluid communication with the vessel via top ducting and/or bottom ducting; heating the air with a heating system in fluid communication with the fan and the vessel via the top and/or bottom ducting; humidifying the air with a humidifying system, in fluid communication with the fan and the vessel; measuring temperature and moisture with sensors; and controlling the fan, humidifying system and the heating system with a controller based on an output from the sensors.

The method of the present invention also includes: cooling the water from the vessel with a cooling system in fluid communication with the vessel and the pump via the tubing; containing the water when a first valve is closed and providing for air movement when open, with the first valve removably attached to the vessel bottom; directing airflow out an exhaust duct or back to the fan with a second valve connected to and in fluid communication with the fan and the vessel via the top ducting; controlling the flow of water into the vessel with a first solenoid valve in fluid communication with the water inlet and controlling the flow of water out of the vessel with a second solenoid in fluid communication with the water outlet: aerating the water with an aeration system in fluid communication with the vessel via the tubing; and controlling the cooling system, the pump, the first and second valves, the first and second solenoid valves, and the aeration system through the controller.

The method of the present invention also includes cooling and dehumidifying the air with a refrigerant to air heat exchanger, in closed loop with the cooling system.

The method of the present invention also includes filtering the water with a filter, in fluid communication with the vessel and the pump via tubing, thereby removing particles.

The method of the present invention also includes positioning in a vessel with a volume between four and four hundred liters.

The method of the present invention also includes the vessel shaped like a cylindroconical.

The method of the present invention also includes measuring water flow, weight, carbon dioxide, dissolved oxygen, air flow, current and/or vibration with sensors.

The method of the present invention also includes controlling the pump, the first and second valves, the cooling system, the fan, the heating system, the humidifier, the aeration system, and the first and second solenoid valves by inputting from a touchscreen on the component box, an app on a smartphone, or through a website on a computer, and the controlling uses analyzing with algorithms, comparing with derived formulas and/or lookup tables and connecting with the internet through a wifi controller in communication with the controller.

A method for malting grain, includes: filling a container with water and grain; cleaning the grain with water; steeping the grain with water; air resting the grain; germinating the grain; free drying the grain; curing the grain; and optionally roasting the grain.

The method for malting grain where the method is carried out in an apparatus having: a hollow vessel having a vessel bottom and a vessel midsection; a first false bottom, removably positioned into a narrow end of the vessel, near the vessel bottom, retaining grain; a second false bottom, removably positioned into the midsection of the vessel, retaining grain; a fan connected to and in fluid communication with the vessel via top and/or bottom ducting and allowing air flow through the vessel and the first and second false bottom; a heating system, in fluid communication with the fan and the vessel via the top and/or bottom ducting to heat air from the fan; a humidifier, in fluid communication with the fan and the vessel via the top and/or bottom ducting to humidify the air; sensors, to measure temperature and moisture; and a controller, in communication with the sensors, and controlling the fan, the heating system and the humidifier; where the first false bottom is used for cleaning and steeping grain and the first false bottom, the valve and the grain are removed from the vessel following cleaning, steeping and resting, and; the second false bottom is inserted into the vessel and the grain is returned to the vessel for germinating and kilning.

The vessel may be made of 304 stainless steel such as those produced by Volrath Manufacturing (Sheybogan, Wis.), Toledo Metal Spinning (Toledo, Ohio) or Acme Metalspinning (Fridley, Minn.), or the vessel may be manufactured in-house. The vessel may have shapes including: Cylindroconical, cylinder, large cylinder stacked on smaller cylinder, conical, box, pyramid and a box stacked on pyramid. Vessels may vary in size between 4 and 400 liters. A cap may be clamped onto the lid of the vessel. A circular clamp, a tri clamp, screw clamp, duct clamp, or a duct clamp with a gasket may be used. The vessel may be supported by metal legs and may have a metal lid on top of it. The vessel may contain ports for fluids to enter and exit.

False bottoms used in a preferred embodiment are a first false bottom, a 2 inch diameter wire mesh false bottom and a second false bottom, a 16 inch diameter stainless steel false bottom with circular holes. False bottoms may have circular holes or slotted holes or be of wire mesh or plastic mesh. False bottoms may be manufactured in-house or by McNichols (Annapolis Junction, Md.) or other producers may be used. The stainless steel false bottom may vary in size from 12 inches to 20 inches in diameter. The mesh false bottom may vary in size between ½ inch to 4 inches in diameter.

Pumps may be of various types, including centrifugal, inline, submersible, end suction, self-priming, positive displacement and diaphragm with a centrifugal inline pump used in the preferred embodiment. Pumps may be manufactured in-house or from Fountain Mountain (Santa Maria, Calif.), Fluval (Quebec, Canada), EcoPlus (Barberton, Wash.), Lifegard (Cerritos, Calif.), Flojet (Miami, Fla.), Shurflo (Costa Mesa, Calif.), Chugger (Farmingdale, N.J.), March (Queenstown, Md.), The Vintage Shop (Delta, BC, Canada), Castle (Nottingham, UK), Watson-Marlow (Cornwall, UK), The Vintner Vault (Temecula, Calif.), Yamada (Arlington Heights, Ill.) or Rodem (Cincinnati, Ohio).

Tubing may be copper (type M, type L, drawn temper, annealed), plastic, vinyl, PVC or stainless steel. Tubing made of drawn temper copper may vary between ⅛ inch and 1 inch in diameter, with ½ inch type M in a preferred embodiment. Tubing may be manufactured in-house or from producers such as Mueller (Memphis, Tenn.) and Wieland (Pine Hall, N.C.).

Ducting may be: triclamp, flexible, rigid, sheet metal, insulated, fiberglass lined, fiberboard; round, square or rectangular in shape; made of stainless steel, flexible aluminum, rigid aluminum, galvanized steel, polyurethane, plastic or PVC; and between 2 inches and 4 inches in diameter. Ducting may be produced in-house or by McMaster-Carr (Elmhurst Ill.), Everbilt (Wilmington, Del.), Thermaflex (Abbeville, S.C.), Quietflex (Houston, Tex.), Hart & Cooley (Grand Rapids, Mich.), Snappy (Marietta, Ga.), Southwark (Philadelphia, Pa.), Dundas-Jafine (Brampton, Ontario, Canada), Atco (Ferris, Tex.), Broan (Hartford, Wis.) or Westaflex (Gutersloh, Germany). The top ducting and bottom ducting may be clamped onto the lid of the vessel and the bottom of the vessel. A circular clamp, a tri clamp, screw clamp, duct clamp, or a duct clamp with a gasket may be used.

Water valves may be of the solenoid, check, swing check, butterfly, ball, gate, globe, plug, poppet, air actuated or electrically actuated types and made out of bronze, stainless steel, brass, copper or PVC materials and vary between ½ inch and 3 inches. In a preferred embodiment two different valves are used: ½ inch stainless steel solenoid valves to control water flow into the vessel and out to the drain; and a ½ inch stainless steel electrically actuated ball valve to keep water in the vessel or allow air out the bottom. These water valves may be manufactured in-house or by Apollo (Matthew, N.C.), Dayton (Niles, Ill.), Value Brand (Taiwan), S&K Automation (Plymouth, Minn.), Gemini (Raymond, N.H.), U.S. Solid (Cleveland, Ohio), McMaster-Carr (Elmhurst Ill.) or EchoTech (Canton, Ga.)

Filters may be of the nominal, absolute, backwashing, cartridge, depth, surface, or pleated types and made out of cotton, polypropylene, activated carbon, or ceramic materials. The preferred embodiment is a pleated filter made out of polypropylene of the nominal, cartridge, and depth variety. The filters may be manufactured in-house or by Pentek, Hydronix, Tier-1, Whirlpool, Culligan, or 3M.

Aeration systems may be of the compressed air, air pump, diffusion stone, jet aeration, fountain aeration, surface, subsurface, coarse bubble, or fine bubble types and made out of plastic, stainless steel, vinyl, or PVC materials. The preferred embodiment is a plastic air pump with a stainless steel diffusion stone attached to the end of the vinyl tubing. The aeration systems may be manufactured in-house or by Tetra, Azoo, Coralife, Rena, or Jardin.

Air valves may be of the inlet vane damper, discharge damper, balancing damper, volume control damper or diverter valve type, sized between 2 and 4 inches and made from rigid aluminum, galvanized steel, plastic, PVC, stainless steel or polyurethane. In a preferred embodiment a 4 inch galvanized steel inlet vane damper is used at the fan inlet to control fan speed and a 2 inch stainless steel actuated diverter valve is used inline in the top ducting to either exhaust hot moist air or recirculate hot dry air. Air valves may be manufactured in-house or by Nordfab (Thomasville, N.C.), Greenheck (Schofield, Wis.), KB Duct (Greensboro, N.C.), US Duct (Kernersville, N.C.), Speedi-Products or Twin City Fan and Blower (Plymouth, Minn.).

Humidifying systems may be of the ultrasonic fogger, misting nozzle or spray nozzle type. In a preferred embodiment ultrasonic fogging is used in a sealed container connected to ducting. Humidifying systems may be manufactured in-house or by House of Hydro (Ft. Myers, Fla.), Nutramist (N.Y. or Etree, Exo Terra (Mansfield, Mass.).

The cooling system may be compressor refrigeration or thermoelectric cooling. In a preferred embodiment a compressor refrigeration unit is used with water chilling and refrigerant-to-air heat exchanger capabilities in an evaporator loop. Cooling systems may be manufactured in-house or by Copeland (Lebanon, Mo.), Tradewinds Chillers (Escondido, Calif.), Embraco (Duluth, Ga.), Secop (Roswell, Ga.), Tecumseh (Ann Arbor, Mich.), Panasonic (Newark, N.J.) or TermoTek (Baden-Baden, Germany)

The heating system may be of various types including direct heating, indirect heating, electrically resistive, combustive, screen-printed or infrared and made of nichrome, kanthal, cupronickel, mica or ceramic. In a preferred embodiment a resistive heating element is made of 18 gauge coiled nichrome wire wrapped around a mica structure Heating elements may be manufactured in-house or by Temco (Hillsdale, N.J.), http://jacobs-online.biz/, Omega (Stamford, Conn.) or Pelican (Naples, Fla.).

Fans may be of the centrifugal, direct drive, variable speed, forward-curved, backward-curved, backward-inclined, radial blade, airfoil positive displacement or axial type. In a preferred embodiment a centrifugal fan is used with a direct drive motor and forward-curved blades. Fans may be manufactured in-house or by Fasco (Cassville, Mo.), Greenheck (Schofield, Wis.), Twin City Fan and Blower (Plymouth, Minn.), New York Blower Company (Willowbrook, Ill.), Ametek Dynamic Fluid Solutions (Kent, Ohio), Dayton (Niles, Ill.) or EBM-Papst (Mulfingen, Germany).

The component box may be of the cube, cuboid, cylinder, hemisphere, ovular prism, trapezoidal prism, or filleted type and made of stainless steel, aluminum, steel, zinc, copper, wood, plywood, plastic, PVC, acrylic, plexiglass or ceramic materials. In a preferred embodiment a stainless steel cuboid with filleted edges is used. Component boxes may be manufactured in-house or by Discount Steel (Minneapolis, Minn.), Accurate Metal Products (Rockford, Ill.), Johnson Bros. Metal Forming Co. (Berkeley, Ill.), or A & C Metals (Blaine, Minn.).

The temperature sensor may be of the thermistor or thermocouple type. In a preferred embodiment a thermocouple is used. The humidity sensor may be an I2C device, such as the SHT31-D or HTU21D-F, made in-house or by such companies as Texas Instruments (Germantown, Md.), Sensirion (Staefa, Switzerland), or Measurement Specialties (Hampton, Va.). The flow meter may be either an inline, liquid flow meter or contactless ultrasonic flow meter. The weight sensor may be load cells or load sensors Additional sensors which may be used include an optical infrared LED-based for measuring carbon dioxide, a galvanic HDPE probe-based microcontroller for measuring dissolved oxygen, a pitot or anemometer for measuring air flow, a split core current transformer for measuring current and a spring vibration switch for measuring vibration. In a preferred embodiment, a thermistor and humidity sensor are situated inside the vessel, load cells are situated beneath the vessel, and an inline, liquid flow meter is in the inlet water tubing.

Various microcontrollers or processors may be used including STM32F205 120 Mhz ARM Cortex M3, ATmega328 and ATmega2560. These may be made in-house or by Arduino.cc, Digital Imp (Liverpool, UK), Raspberry Pi (UK) or Particle.io.

The power supply provides the necessary AC or DC power to each component, at its needed voltage. Solid state or electromechanical relays may be used between the power supply and the component to provide automated control via the controller.

Connection to the internet may use hardware and software provided by Particle.io, Digital Imp (Liverpool, UK), or other companies. A wifi chip (such as the Broadcom BCM43362 Wi-Fi chip or the ESP8266) in communication with the microcontroller enables communication with the internet. It is also possible to connect to the internet using Bluetooth (R) wireless technology.

User input to the invention may occur through an interface on the component box, an app on a smartphone, or through a website on a computer. The component box interface may consist of an electronic screen, touch screen, or lights combined with control buttons, keys, knobs, or wheels.

The software combines real time measurement from sensors, derived formulas/look up tables, and user input to actuate components in order to maintain optimal malting conditions. During steep, sensor readings of the water, flow rate, and ambient temperatures are combined with known rates at which grain uptakes water and oxygen and user inputted recipe specifications to decide when water should be filled, cooled, aerated, or drained. During germination, sensor readings of internal vessel and ambient temperatures and relative humidity are combined with known rates at which grain produces $CO_2$ and heat, rates at which grain dries out from conditioned air, and user inputted recipe specifications to determine when the grain should be cooled, humidified, and turned by the user. Similarly, temperature and humidity readings are combined with drying rates and user input to optimize kilning.

Alternative configurations include those for hop drying and lagering. For hop drying the larger false bottom may be placed in the vessel, and the kilning components (the heating element, fan, ducting, sensors, and controller) may be used to slowly dry hop cones down at low temperatures to preserve them, in the manner of a hop oast drying system. For lagering, a lagering jacket may be placed around the outside of the vessel and connected to the cooling system to create a lagering vessel for fermenting beers at cold temperatures. Fluid may be run through the jacket and cooling system to maintain a constant temperature inside the vessel.

This invention simplifies the process of malting thereby introducing a much wider audience to malting and sprouting grains. Advantages offered by the present invention to this new audience include: greater control over the malting process; the ability to produce malt unavailable commercially from grains other than the traditional barley, wheat, and rye, such as: amaranth, buckwheat, spelt, triticale, sorghum, hazelnuts, chickpeas, quinoa, millet, emmer, rice, corn, oats, teff, wild rice, chia, etc.; the ability to use historical, heirloom, or local varieties of barley unavailable commercially as malt, which can offer superior flavors over commercial barley bred only for yield and disease resistance; and greater malt freshness. The accurate, automated control of temperature, moisture, and dissolved oxygen and carbon dioxide makes the process of high-quality, consistent malting accessible to the consumer. This invention offers a small size, compact footprint and a consolidated component box. The steps of cleaning, steeping, air resting, germinating, free drying and curing may all occur in a single vessel, on such a small scale that the grain can be managed just with the hands. The conical steep tank requires less water and provides faster cooling than current devices. The flat bottom germination and kiln setup and the resulting uniform grain bed depth gives better air distribution than current devices providing even airflow and consistency of germination. The flat bottom also allows easier hand mixing of the grain. The heating element provides high indirect heat compared with other kilns, which do not achieve the temperatures required for roasting malt. This invention provides for steep water recirculation which allows faster temperature control, better cleaning through the filter, and better aeration than without recirculation. Full automation and internet-enabled connectivity allow the consumer to control the device remotely.

This invention describes an affordable, compact, single vessel, automated malting system for a person unfamiliar with the practice of malting to produce consistently high quality malt. A compact, single vessel does not require additional grain processing and or moving equipment, requires less space and is available at a lower cost when compared to multiple vessel malting systems. The use of two false bottoms within one vessel enables less water to be used during steeping and minimizes the size of the cooling device which reduces production costs. The preferred cylindroconical vessel shape used for steeping then provides effective airflow distribution through the grain bed when moved to the higher, larger second false bottom. The grain transfer between the two false bottoms also allows for the vessel to be thoroughly cleaned between steep and germination, preventing mold or microbial infection of the grain.

This invention also provides an affordable, compact, single vessel, automated malting system for a person familiar with the practice of malting for developing recipes, which can be scaled up to a system of 1-5 tons. Craft malthouses are small malt producers, unable to afford existing, expensive micromalting equipment and also unable to afford the risk of a failed batch of 1-5 tons of grain when developing a new recipe using their normal equipment. This affordable, compact, single vessel, automated malting system allows for cost effective recipe development with little oversight or intervention required during the malting process. The use of two false bottoms in the vessel replicates, in one compact unit, the conditions of a conventional steep tank, Saladin box and kiln. This allows for easy scaling of recipes from 25 lbs to 5 tons.

All patents cited herein are hereby incorporated by reference in their entirety to the same extent as if each individual patent was specifically and individually indicated to be incorporated by reference. Other features and advantages of the invention will become apparent from the following detailed description, and from the claims.

BRIEF DESCRIPTION OF THE DRAWINGS

All Figures are illustrated for ease of explanation of the basic teachings of the present invention only; the extensions of the Figures with respect to number, position, relationship and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

FIG. 2B of the drawings shows a side view of a portion of the grain malting device during water recirculation, cooling, and aeration.

FIGS. 3A and 3B of the drawings shows a side view of a portion of the grain malting device during air rest between steeping.

FIGS. 4A and 4B of the drawings shows a side view of a portion of the grain malting device during germination.

FIGS. 5A and 5B of the drawings shows a side view of a portion of the grain malting device during kilning.

DETAILED DESCRIPTION OF THE INVENTION

Figure 1:
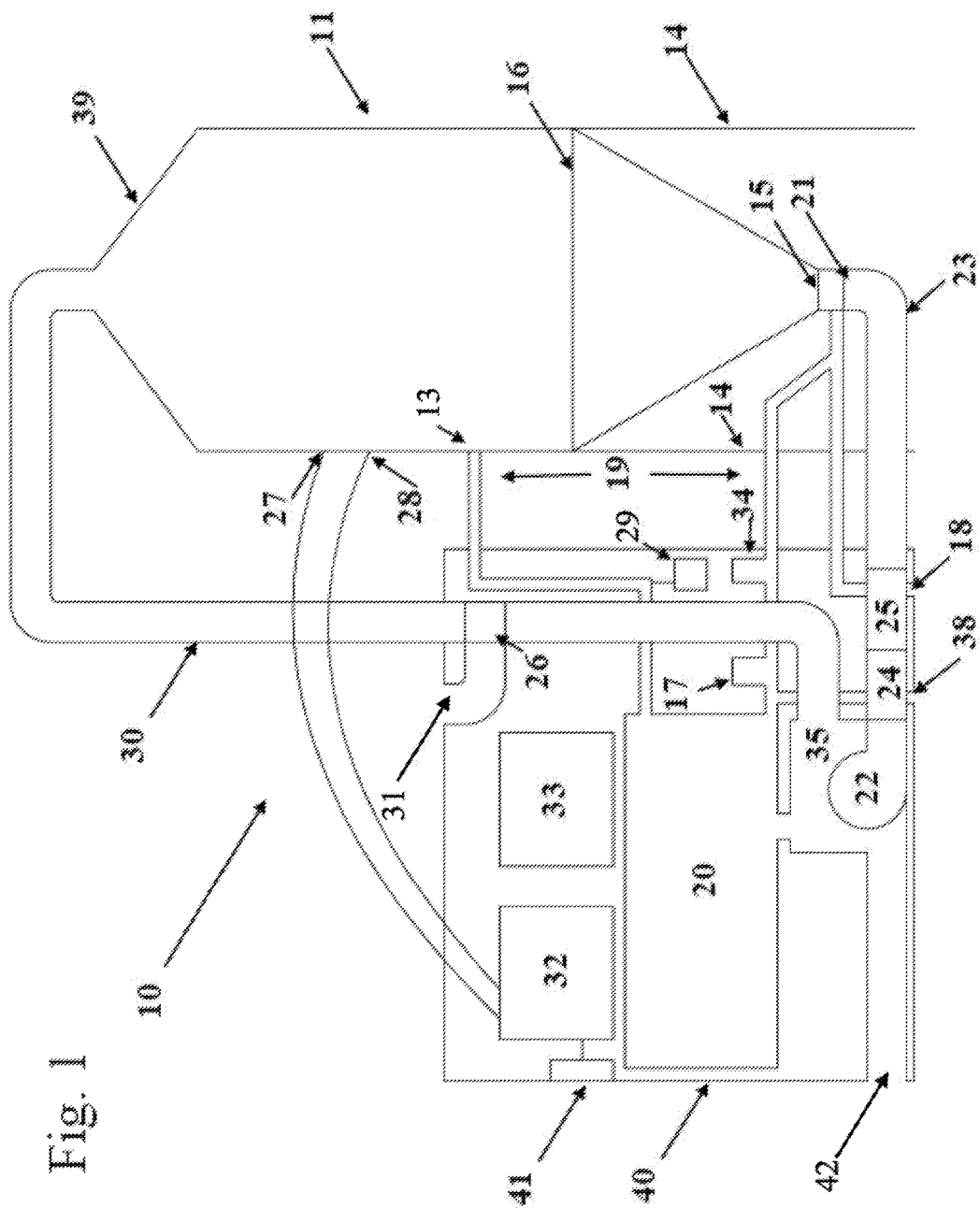
FIG. 1 of the drawings shows a side view of a grain malting device.

The Figures generally illustrate exemplary embodiments of an apparatus 10 for malting grain in a hollow vessel 11 with a removable first false bottom 15 and a removable second false bottom 16. The particular embodiments of this device 10 illustrated in the figures have been chosen for ease of explanation and understanding of various aspects of the present inventions. These illustrated embodiments are not meant to limit the scope of coverage but instead to assist in understanding the context of the language used in this specification and the appended claims.

As illustrated throughout the figures, especially FIG. 1, the apparatus 10 is for malting grain 50 and generally includes a hollow vessel 11 having a vessel bottom and a vessel midsection. Legs 14 support the hollow vessel 11. A first false bottom 15, removably positioned into a narrow end of the vessel 11, near the vessel bottom, retains grain 50 during water filling, cooling and aeration. A second false bottom 16, removably positioned into the midsection of the vessel, retains grain 50 during germination and kilning. A house water supply is connected to and in fluid communication with a water inlet 18 and the vessel 11 via tubing 19 and a first solenoid valve 36 allows water flow into the hollow vessel 11 and through the first false bottom 15. A cooling system 20 is in fluid communication with the vessel 11 and a pump 17 via the tubing 19. A first valve 21 is removably attached to the vessel bottom and contains water in the vessel when closed and allows air flow into or out of the vessel 11 when open, as shown in FIGS. 3A and 3B. A fan 22 connected to and in fluid communication with the vessel 11 via bottom ducting 23 and/or top ducting 30 allows air flow through the vessel 11 and the first 15 or second false bottom 16. A heating system 24, in fluid communication with the fan 22 and the vessel 11 via bottom ducting 23 and top ducting 30 heats air from the fan 22. Air enters the grain malting device through inlet duct 42. A humidifier 25, in fluid communication with the fan 22 and the vessel 11 via bottom ducting 23 or top ducting 30 humidifies the air entering the bottom ducting 23 or top ducting 30. The top ducting 30 may have an exhaust duct 31 for exhausting air. A temperature sensor 27 measures temperature and a moisture sensor 28 measures moisture. A controller 32, is in communication with the sensors 27 and 28 and controls the pump 17, the first 21 and second valves 26, the cooling system 20, the fan 22, the heating system 24, the aeration system 29, and the humidifier 25. The apparatus 10 also includes a filter 34, in fluid communication with the vessel 11 and the pump 17 via tubing 19 to filter particles out of the water. The apparatus also includes a refrigerant to air heat exchanger 35, in closed loop with the cooling system 20, to cool and dehumidify air. The apparatus may also have a lid 39 on top of the vessel 11. The apparatus has a component box 40 housing the pump 17, the cooling system 20, the fan 22, the heating system 24, the humidifier 25, the second valve 26, the aeration system 29, the controller 32, the power supply 33, the filter 34, the heat exchanger 35, the inlet duct 42, the exhaust duct 31 and part of the top ducting 30.

Figure 2A:
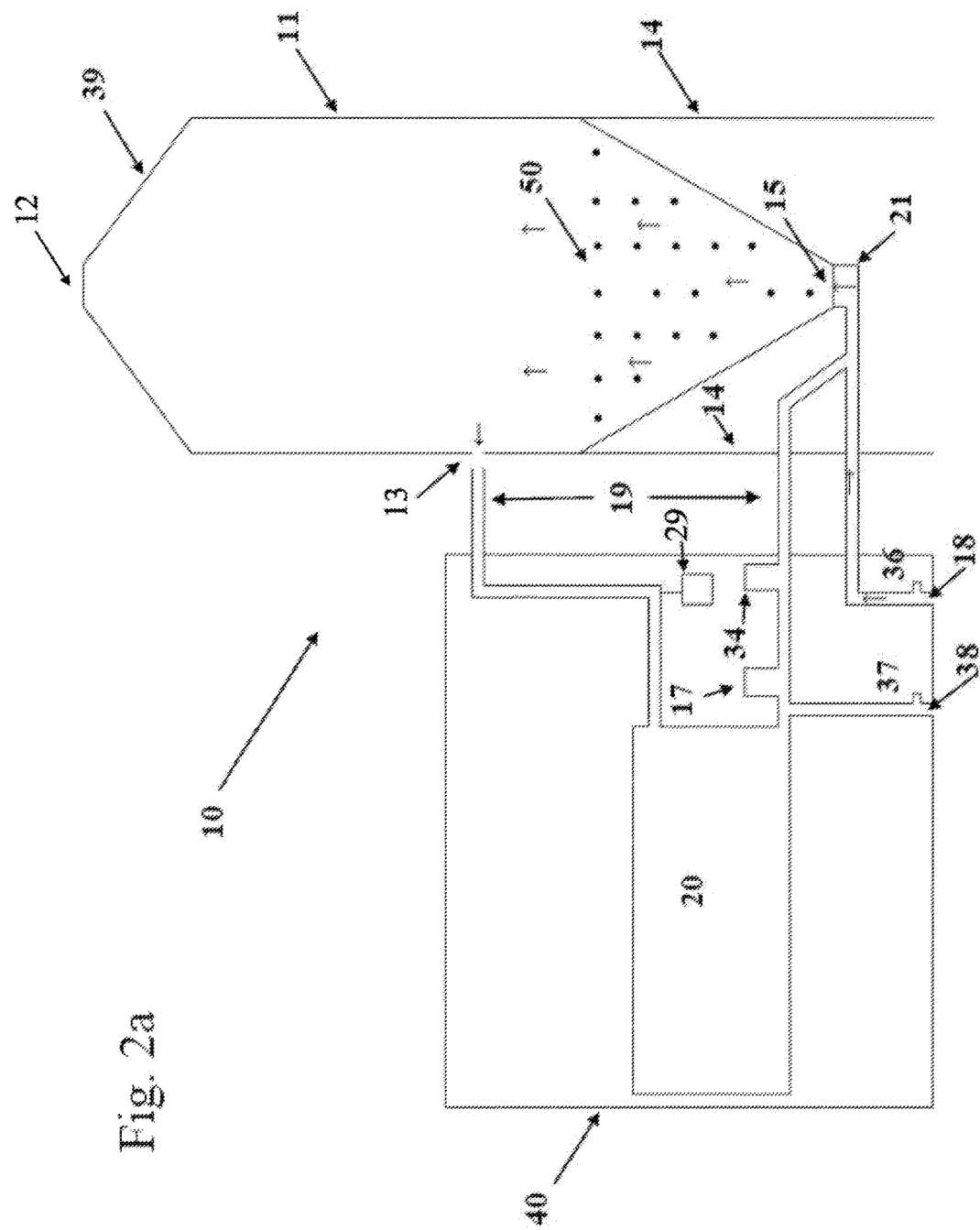
FIG. 2A of the drawings shows a side view of a portion of the grain malting device during water filling and grain cleaning.
Figure 2C:
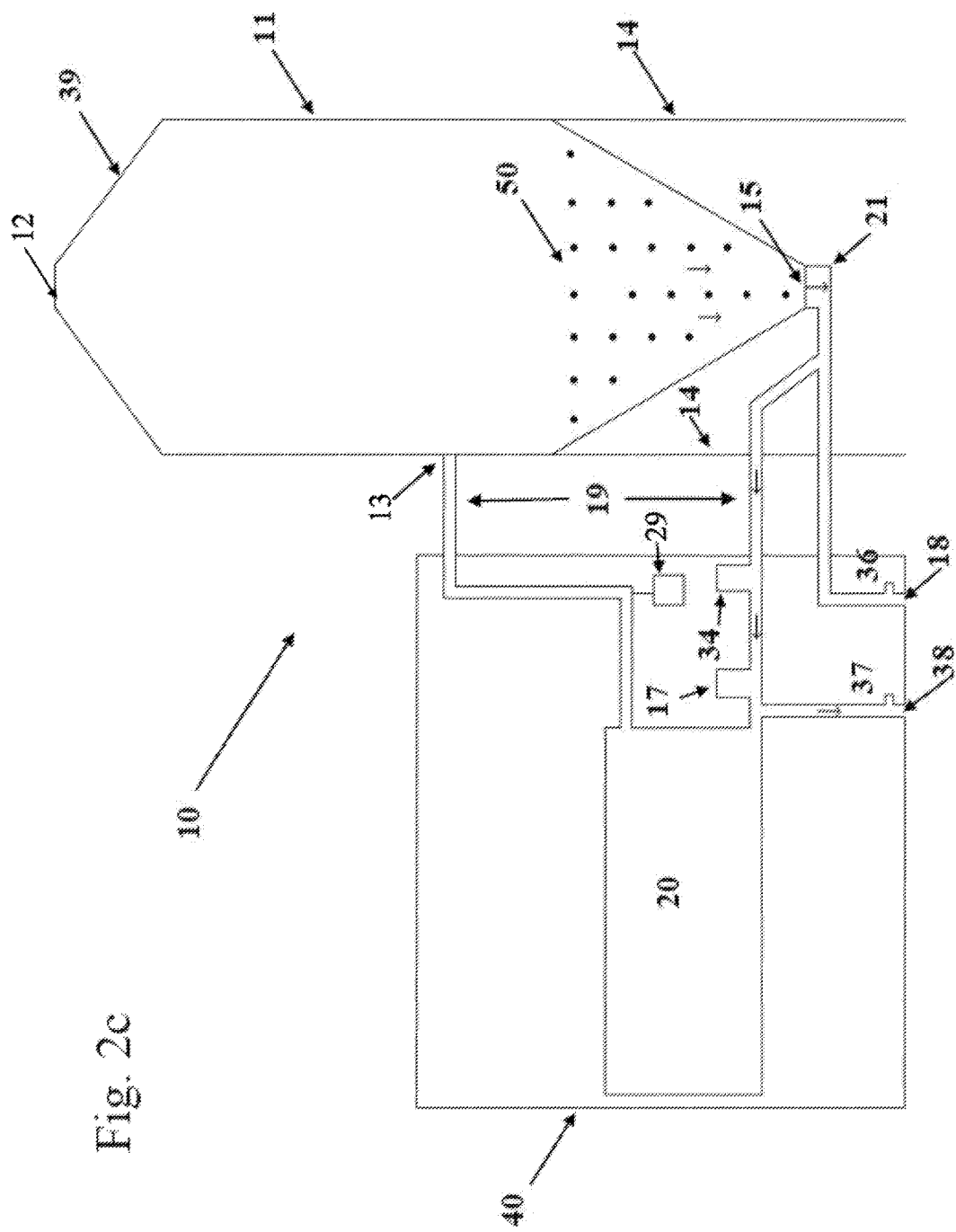
FIG. 2C of the drawings shows a side view of a portion of the grain malting device during water draining.

FIG. 2A shows the grain malting device 10 during water filling and grain cleaning. FIG. 2B shows the grain malting device 10 during water recirculation, cooling, and aeration. FIG. 2C shows the grain malting device 10 during water draining. In FIGS. 2A, 2B and 2C, the small arrows indicate the direction of water flow within the tubing 19 and vessel 11. The vessel 11 has a first false bottom 15 placed near a bottom of the hollow vessel 11. Grain 50 is added to the vessel retained by the first false bottom 15. A house water supply is connected to and in fluid communication with a water inlet 18 and the vessel 11 via tubing 19. The apparatus 10 may also include a filter 34, in fluid communication with the vessel 11 and the pump 17 via tubing 19 to filter particles out of the water. A cooling system 20 is in fluid communication with the vessel 11 and the pump 17 via the tubing 19 and cools the water. An aeration system 29 is in fluid communication with the vessel 11 and the pump 17 via the tubing 19 and aerates the water. The apparatus may also have a lid 39 on top of the vessel 11. A cap 12 may be clamped onto the lid 39 of the vessel 11. The apparatus may also include a first solenoid valve 36 in fluid communication with the water inlet 18 and a second solenoid valve 37 in fluid communication with the water outlet 38 with the first and second solenoid valves 36, 37 controlling water entering and exiting the system. The first and second solenoid valves 36, 37 are controlled by the controller 32. The apparatus has a component box 40 housing the pump 17, the cooling system 20, the aeration system 29, the filter 34, and the first and second solenoid valve 36, 37. In FIG. 2A water flows in from the water inlet 18 upwards though first valve 21, through the grain 50 and exits the vessel 11 through port 13. In FIG. 2B water is recirculated through tubing 19, attached to port 13, down through the grain 50, through first false bottom 15, the first valve 21, the filter 34, the pump 17, the cooling system 20 and the aeration system 29. In FIG. 2C water flows from the grain 50 through first false bottom 15, through first valve 21 and out water outlet 38.

FIGS. 3A and 3B of the drawings show a grain malting device 10 during air rest between steeping steps. Grain 50 is held in vessel 11 by the first false bottom 15. Conditioned air, entering the grain malting device through inlet duct 42, is blown by the fan 22 through the grain 50 to cool the grain 50, maintain moisture and evacuate carbon dioxide. The arrows indicate the direction of air flow, which is down through the grain 50, first false bottom 15 and first valve 21 in FIG. 3A or up through the grain 50, first false bottom 15 and first valve 21 in FIG. 3B. A cooling system 20, in closed fluid communication with the heat exchanger 35, and in fluid communication with the fan 22 and the vessel 11 via top ducting 30 in FIG. 3A and via bottom ducting 23 in FIG. 3B may cool air from the fan 22. The apparatus may also have a lid 39 on top of the vessel 11. A humidifier 25, in fluid communication with the fan 22 and the vessel 11 via top ducting 30 in FIG. 3A and bottom ducting 23 in FIG. 3B may humidify the air entering the top ducting 30 or bottom ducting 23. The first false bottom 15 holds the grain 50 in the hollow vessel 11. The apparatus has a component box 40 housing the cooling system 20, the fan 22, the humidifier 25 the heat exchanger 35, and the inlet duct 42.

FIGS. 4A and 4B of the drawings show a side view of a grain malting device during germination. The first false bottom 15, the first valve 21 and the grain 50 are removed from the vessel 11 following cleaning, steeping and resting (shown in FIGS. 2A, 2B, 2C, 3A and 3B), and the second false bottom 16 is inserted into the vessel 11 and holds the grain 50, which is returned to the vessel 11 for germinating and kilning. Conditioned air, entering the grain malting device 10 through inlet duct 42, is blown by the fan 22 through the grain 50 to cool the grain 50, maintain moisture and evacuate carbon dioxide. The apparatus may also have a lid 39 on top of the vessel 11. The arrows indicate the direction of air flow, which is down through the grain 50 and the second false bottom 16 in FIG. 4A or up through the grain 50 and the second false bottom 16 in FIG. 4B. A cooling system 20, in closed fluid communication with the heat exchanger 35, and in fluid communication with the fan 22 and the vessel 11 via top ducting 30 in FIG. 4A or bottom ducting 23 in FIG. 4B may cool air from the fan 22. A humidifier 25, in fluid communication with the fan 22 and the vessel 11 via top ducting in FIG. 4A or bottom ducting 23 in FIG. 4B may humidify the air entering the top ducting 30 or bottom ducting 23. The apparatus has a component box 40 housing the cooling system 20, the fan 22, the humidifier 25, the heat exchanger 35, and the inlet duct 42.

FIGS. 5A and 5B of the drawings shows a side view of a grain malting device 10 during kilning. The grain 50 is held by the second false bottom 16 in the vessel. Air enters the grain malting system 10 through inlet duct 42 and the fan 22 passes the air to the heating system 24 and blows up through the grain 50, which rests on the second false bottom 16. The apparatus may also have a lid 39 on top of the vessel 11. The air is circulated through the top ducting 30 and the second valve 26 either directs the air through the exhaust ducting 31, as shown in FIG. 5A, or through the rest of the top ducting 30 back to the fan 22 to achieve higher temperatures, as shown in FIG. 5B. The apparatus has a component box 40 housing the fan 22, the heating system 24, the second valve 26, the exhaust duct 31, and the inlet duct 42.

Figure 6:
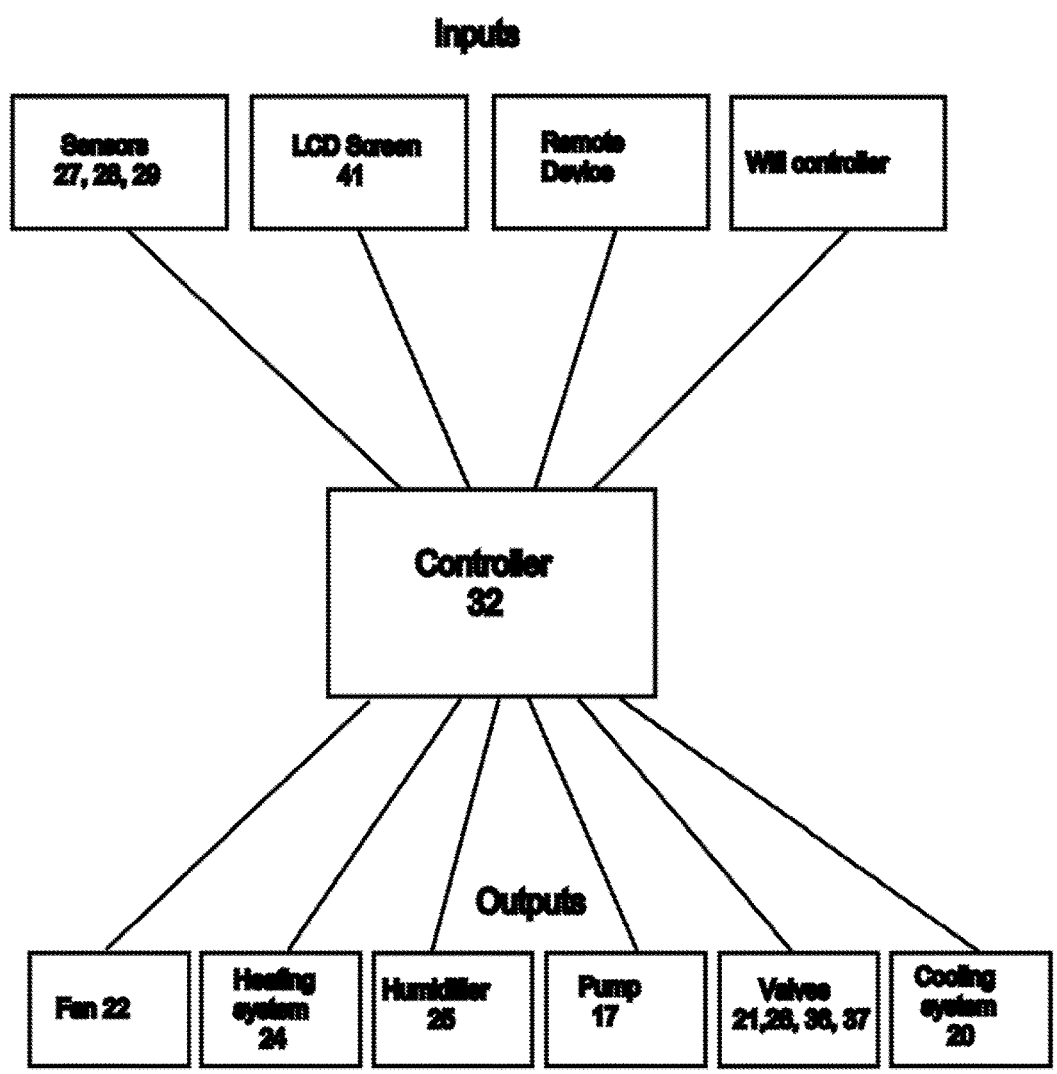
FIG. 6 of the drawings shows a schematic of the operation of the controller of the grain malting device.

FIG. 6 of the drawings shows a schematic of the controller of the grain malting device. The controller 32 may be in communication with a temperature sensor 27, a moisture sensor 28, a weight sensor 43, a flow meter 44, a LCD screen 41 on the component box 40, an app on a smartphone or a wifi controller providing internet connectivity, and accepting user input and using algorithms, derived formulas and look up tables. The controller controls the pump 17, cooling system 20, fan 22, heating system 24, humidifier 25, first valve 21, second valve 26, first solenoid valve 36, second solenoid valve 37 and the aeration system 29.

The foregoing discussion discloses and describes merely exemplary embodiments of the present invention. The invention is not limited to the method and the object as described in detail above. Upon review of the specification, one skilled in the art will readily recognize from such discussion, and from the accompanying drawings and claims, that various changes, modifications and variations can be made therein without departing from the spirit and scope of the invention as defined in the following claims.

The invention claimed is:

1. An apparatus comprising:
   a hollow vessel having a vessel bottom and a vessel midsection;
   a first false bottom, removably positioned into a narrow end of the vessel, near the vessel bottom, retaining grain;
   a second false bottom, removably positioned into the midsection of the vessel, retaining grain;
   a fan connected to and in fluid communication with the vessel via top and/or bottom ducting and allowing air flow through the vessel and the first and second false bottom;
   a heating system, in fluid communication with the fan and the vessel via the top and/or bottom ducting to heat air from the fan;
   a humidifier, in fluid communication with the fan and the vessel via the top and/or bottom ducting to humidify the air;
   sensors, to measure temperature and moisture; and
   a controller, in communication with the sensors, and controlling the fan, the heating system and the humidifier;
   a first solenoid valve in fluid communication with a water inlet and a second solenoid valve in fluid communication with a water outlet and controlling filling and draining of the vessel with water;
   a pump in fluid communication with the vessel via tubing and allowing water flow through the first false bottom, out of the vessel and back into the vessel;
   a cooling system in fluid communication with the vessel and the pump via the tubing and cooling the water;
   a first valve, removably attached to the vessel bottom and containing water when closed, and providing for air movement when open;
   a second valve connected to and in fluid communication with the fan and the vessel via the top ducting and directing airflow out an exhaust duct or back to the fan;
   an aeration system in fluid communication with the vessel via the tubing and aerating the water;
   wherein the first false bottom is used for cleaning and steeping grain and wherein in the first false bottom, the first valve and the grain are removed from the vessel following cleaning, steeping and resting;
   the second false bottom is inserted into the vessel, and the grain is returned to the vessel for germinating and kilning; and
   with the controller, further controlling the first and second solenoid valves, the pump, the cooling system, the first and second valves, and the aeration system.

2. The apparatus of claim 1 further comprising
   a refrigerant to air heat exchanger, in closed loop with the cooling system, to cool and dehumidify air.

3. The apparatus of claim 2, further comprising a filter, in fluid communication with the vessel and the pump via tubing to filter particles out of the water.

4. The apparatus of claim 3 wherein the vessel has a volume between four and four hundred liters.

5. The apparatus of claim 3 wherein the vessel is shaped like a cylindroconical, a cylinder, a large cylinder stacked on smaller cylinder, a conical, a box, a pyramid or a box stacked on pyramid.

6. The apparatus of claim 5 wherein the vessel is shaped like a cylindroconical.

7. The apparatus of claim 6, wherein the controller is in communication with a touchscreen on the component box, an app on a smartphone or a wifi controller providing internet connectivity, with the controller accepting user input and using algorithms, derived formulas and look up tables.

8. The apparatus of claim 7, further comprising: a flow meter, a weight sensor, a carbon dioxide sensor, a dissolved oxygen sensor, an air flow sensor, a current measurement sensor and/or a vibration sensor.

9. The apparatus of claim 8 further comprising a component box housing the pump, the cooling system, the fan, the heating system, the controller, the power supply, the filter, the first and second solenoid valves, the tubing, the top ducting, the bottom ducting, the water inlet and outlet, the humidifier, the heat exchanger, the aeration system, and the second valve.

* * * * *